(12) United States Patent
Tada

(10) Patent No.: US 6,358,168 B1
(45) Date of Patent: Mar. 19, 2002

(54) HYDRAULIC TENSIONER WITH SEAL CAP FORMING AN EXTERNAL OIL RESERVOIR

(75) Inventor: Naosumi Tada, Nabari (JP)

(73) Assignee: Borg-Warner Automotive K.K., Nabari (JP)

( * ) Notice: Subject to any disclaimer, the term of this patent is extended or adjusted under 35 U.S.C. 154(b) by 0 days.

(21) Appl. No.: 09/502,514

(22) Filed: Feb. 11, 2000

(51) Int. Cl.⁷ .................................................. F16H 7/08
(52) U.S. Cl. ...................................... 474/110; 474/101
(58) Field of Search ................................ 474/101, 109, 474/110, 133, 136, 138

(56) References Cited

U.S. PATENT DOCUMENTS

| | | | |
|---|---|---|---|
| 4,743,225 A | * 5/1988 | Okabe | 474/133 |
| 4,963,121 A | * 10/1990 | Himura et al. | 474/110 |
| 5,030,169 A | 7/1991 | Kiso et al. | 474/110 |
| 5,087,225 A | 2/1992 | Futami et al. | 474/91 |
| 5,441,457 A | 8/1995 | Tsutsumi et al. | 474/110 |
| 5,512,019 A | * 4/1996 | Shimaya et al. | 474/110 |
| 5,601,505 A | * 2/1997 | Tada | 474/110 |
| 5,860,881 A | 1/1999 | Tada | 474/110 |
| 5,885,179 A | 3/1999 | Lewis et al. | 474/110 |
| 5,967,921 A | 10/1999 | Simpson et al. | 474/100 |

FOREIGN PATENT DOCUMENTS

DE 849938 9/1952

* cited by examiner

Primary Examiner—David A. Bucci
Assistant Examiner—Vicky A. Johnson
(74) Attorney, Agent, or Firm—Fitch, Even, Tabin & Flannery; Greg Dziegielewski

(57) ABSTRACT

A hydraulic tensioner for an engine timing chain includes a housing having a bore. The end portion of a plunger is slidably fitted into the bore. The end of an oil inlet provided in an engine block is fitted with a seal cap having a C-shaped cross section and an outside concavity. The hydraulic tensioner utilizes the concavity as an oil reservoir. Oil passages are formed in the housing to connect an oil chamber with the concavity. The seal cap has an orifice to connect the oil inlet with the concavity. The present invention results in decreased space occupied by and reduced manufacturing cost for a hydraulic tensioner having an oil reservoir.

9 Claims, 1 Drawing Sheet

HYDRAULIC TENSIONER WITH SEAL CAP FORMING AN EXTERNAL OIL RESERVOIR

BACKGROUND OF THE INVENTION

The present invention relates generally to tensioners used with chain drives in automotive timing and power transmission applications. In particular, the present invention is related to a hydraulic chain tensioner device which has an associated oil reservoir. The oil reservoir is formed between a seal cap located in an engine block or mounting block oil supply passage and the tensioner body.

Chain tensioning devices, such as hydraulic tensioners, are used as control devices for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or unmeshing of the chain with the sprocket teeth. It is especially important in the case of a chain-driven camshaft in an internal combustion engine to prevent the chain from slipping because the camshaft timing can be misaligned by several degrees, possibly rendering the engine inoperative or causing damage.

Hydraulic chain tensioners typically have a plunger slidably fitted into the bore of a housing. The space between the hollow plunger and the housing bore forms an oil or fluid chamber. The plunger is biased in a protruding direction outwardly by a spring located in the fluid chamber to provide tension to an associated chain. A lever arm or shoe is often used at the end of the plunger to assist in the tensioning of the chain. A hydraulic tensioner as used with a tensioner arm or shoe is shown in Simpson et al., U.S. Pat. No. 5,967,921, which is incorporated herein by reference. The hydraulic pressure from an external source, such as an oil pump or the like, flows into the chamber through passages formed in the housing. The plunger is moved outward against the arm and thus, the chain, by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction. In addition, rack and ratchet mechanisms, which are well known in the art are employed to provide a mechanical no-return function. An example of a hydraulic tensioner including the above conventional features and a no-return mechanism is shown in Tada, U.S. Pat. No. 5,860,881, which is incorporated herein by reference.

Typically, oil pressure in the fluid chamber does not rise immediately upon start-up of the engine. This causes an initial insufficient or low oil pressure condition in the oil chamber acting upon the plunger. Poor control of the chain tension and high noise in the chain and associated mechanisms may result during the initial low oil pressure condition.

A hydraulic tensioner with an oil reservoir, as disclosed in Japanese Laid Open Patent H6/45141, has been proposed to solve such problems. In such a hydraulic tensioner, a hold for the storage of oil, i.e., an oil reservoir, that connects to the oil chamber, is formed in the housing and the oil stored in the oil reservoir is supplied to the fluid chamber in a more timely manner. However, in the conventional hydraulic tensioner with an oil reservoir, due to the need for an oil storage hole in the housing, the housing and overall hydraulic tensioner becomes large compared to the requirement for space saving for the engine. Manufacturing costs are also increased.

A hydraulic tensioner has been disclosed by Japanese Laid-Open Utility Model H7/47631, in which the wall of the hydraulic tensioner, for attachment to the engine, is used as a part of the wall of the oil reservoir. A separate concavity for oil storage is formed in the housing. In this example, the manufacturing cost of the unit is high and the overall hydraulic tensioner becomes large.

In the present invention, a hydraulic tensioner is provided which is less expensive to manufacture and is smaller than conventional hydraulic tensioners while addressing the need for a supplying a ready supply of oil to the tensioner during start-up of the engine.

SUMMARY OF THE INVENTION

The hydraulic tensioner of a first embodiment of the present invention includes a hydraulic tensioner for an engine timing chain having a housing and a plunger. The plunger is slidably received in the housing. A seal cap with a C-shaped cross-section having a concavity on its outside surface is mounted at the open end of an oil supply passage provided in the engine block. The concave portion of the seal cap in combination with an outside surface of the tensioner acts as an oil reservoir. An oil passage connects the concavity with an oil chamber formed in the housing. An orifice in the seal cap connects the oil supply passage in the engine block with the concavity formed in the seal cap.

The hydraulic tensioner of this invention utilizes the concavity formed in the seal cap, when mounted on the engine block, so that separate formation of an oil storage hold or a concavity in the tensioner housing is unnecessary, thereby reducing manufacturing costs and preventing an increase in the overall size of the housing, thereby saving space.

Oil is supplied to the oil reservoir which is the outside concave portion of the seal cap via an orifice formed in the seal cap and the oil supply passage in the engine block. Thus, oil from the oil reservoir is retained in the oil chamber in the tensioner housing after shut down on account of the seal cap and thus oil is available in the fluid chamber, even immediately after re-starting the engine.

For a further understanding of the present invention and the objects thereof, attention is directed to the drawing and the following brief description thereof, to the detailed description of the preferred embodiment of the invention and to the appended claims.

DETAILED DESCRIPTION OF THE PREFERRED EMBODIMENTS

Figure 1:
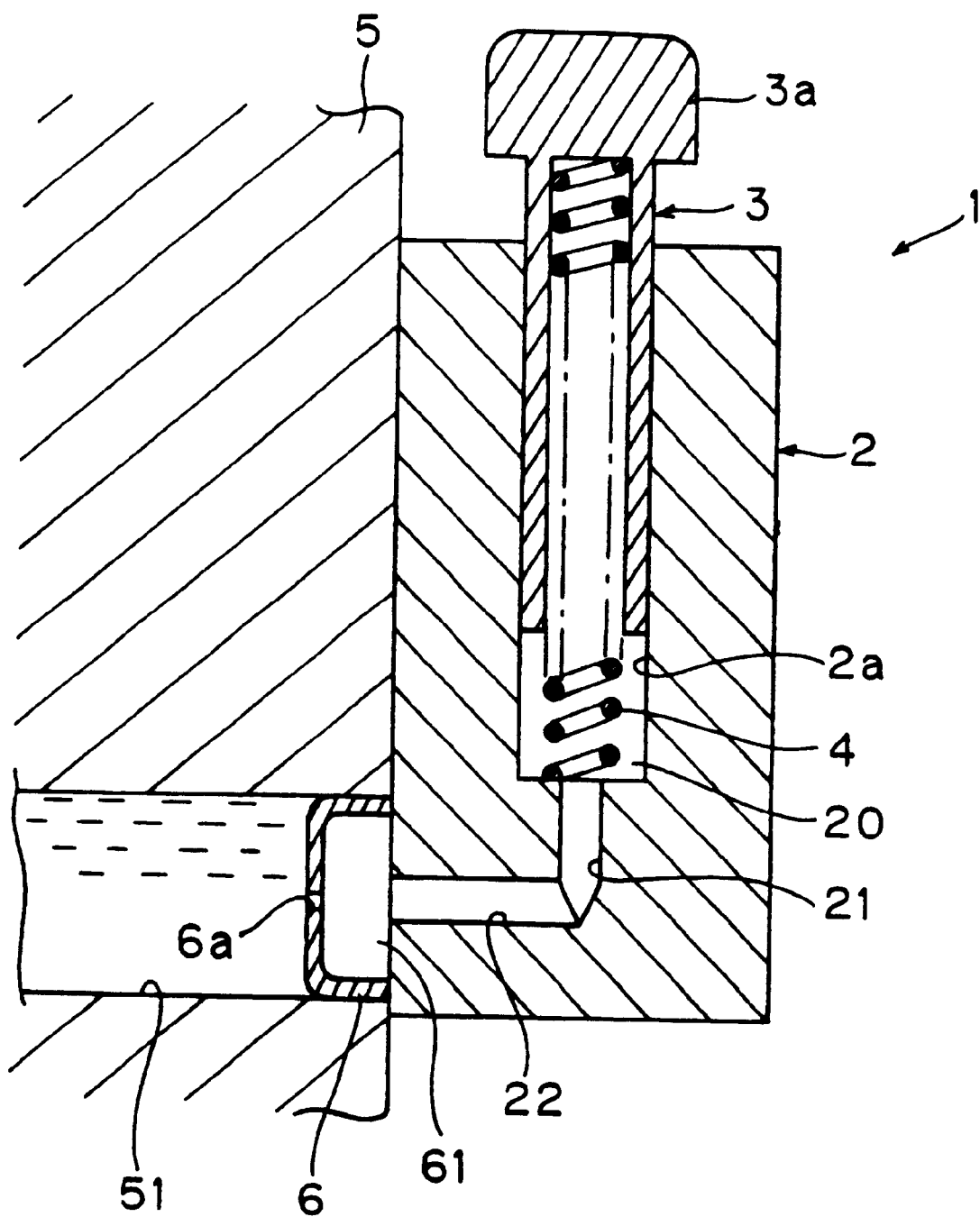
FIG. 1 is a cross-section of a hydraulic tensioner of an embodiment of this invention.

Turning now to the drawings, FIG. 1 illustrates a preferred embodiment of the present invention. As shown in the cross-section of FIG. 1, hydraulic tensioner 1 comprises a housing 2, in which a bore 2a is opened at one end, a plunger 3, the rear end of which is inserted in bore 2a, and a coil spring 4 applies a force to plunger 3 in the projecting direction.

First and second ends of coil spring 4 are press-contacted to the bottom wall of bore 2a and the inner wall of tip 3a of the plunger, respectively. Tip 3a of the plunger is in contact with a tensioner arm (not shown), which is placed on the side of the slack span of the chain (not shown). Oil passages 21 and 22 are formed in housing 2 and oil passage 21 opens to the bottom wall of bore 2a and oil passage 22 opens to the outer wall of housing 2.

Main galley or conduit 51, which is an oil supply passage, is formed in engine block 5 and seal cap 6 with a generally C-shaped cross-section is mounted on the open end of this main conduit 51. A concavity 61 is formed by the C-shape of seal cap 6 on the outside of seal cap 6 and orifice 6a is formed at the radial center of seal cap 6. Oil passage 22 is connected to concavity 61. Hydraulic tensioner 1 utilizes concavity 61 as an oil reservoir through the above-mentioned composition.

In operation, immediately after engine start-up, a chain is pulled by the drive sprocket and a slight slackening occurs on the side of the slack span of the chain, thereby projecting plunger 3 by the force of coil spring 4. Then, the pressure in oil chamber 20, which is formed by bore 2a and the hollow rear end of the plunger, becomes lower. As a result, the oil stored in concavity 61 flows into oil chamber 20 via oil passages 21, 22. Thereby, the oil pressure caused by oil flowing into oil chamber 20 and the force of coil spring 4 act on plunger 3. When the engine is in operation, the oil in main conduit 51 is led to concavity 61 via orifice 6a and is stored in concavity 61.

When the tension of the chain increases during engine operation and a force in the plunger in the direction of retraction acts from the chain onto plunger tip 3a, pressurized oil in oil chamber 20 gradually returns into main conduit 51 from oil passages 21, 22 via orifice 6a of seal cap 6. Thereby, sudden retraction of plunger 3 is prevented.

The outside concave space of seal cap 6, which is mounted to the open end of main conduit 51 in engine block 5, is used as an oil reservoir, so that separate formation of an oil storage hold or concave space in housing 2 becomes unnecessary. As a result, the cost of manufacturing such a reservoir is eliminated and the overall size of the housing, is also reduced to save space. Furthermore, an oil reservoir is provided directly to the open end of main conduit 51 without the presence of a by-pass passage, so that the time to supply oil from the main conduit 51 to the oil reservoir can be shortened.

As explained above, in the hydraulic tensioner of this invention, the outside concave portion of the seal cap is utilized as an oil reservoir, an oil passage that connects the concavity with the oil chamber is formed in the housing and an orifice that connects the oil supply passage with the concavity is formed in the seal cap, so that separate formation of an oil storage hole or concavity in the housing is unnecessary and reduction of manufacturing costs can be realized, as well as space-saving.

While an embodiment of the invention is illustrated, it will be understood that the invention is not limited to this embodiment. Those skilled in the art to which the invention pertains may make modifications and other embodiments employing the principles of this invention, particularly upon considering the foregoing teachings.

What is claimed is:

1. A reservoir for a hydraulic tensioner for a power transmission chain comprising:

a housing having a bore;

a plunger slidably received in said bore forming a fluid chamber therebetween;

a spring biasing said plunger in a protruding direction for said bore;

a first fluid passage extending from a source of oil to said fluid chamber, a seal cap being fitted into said first passage, said seal cap being generally C-shaped in cross section, said C-shape forming an open side and a closed side facing said source of oil and including a small orifice to permit passage of fluid through said closed side at a slow rate of flow, said C-shaped seal cap forming a fluid reservoir to hold fluid for said fluid chamber, said orifice sized to retain an amount of fluid on the open side of said C-shaped seal cap when said tensioner is not in operation effective to pressurize the fluid chamber upon start-up of the engine system.

2. The reservoir for a hydraulic tensioner for a power transmission chain of claim 1 wherein said orifice has a diameter substantially smaller than the diameter of said open side of said seal cap.

3. The reservoir for a hydraulic tensioner for a power transmission chain of claim 1 wherein a second passage is formed between said seal cap and said fluid chamber to carry fluid from said source of oil to said chamber, the diameter of said second passage being less than the diameter of the open side of said seal cap.

4. The reservoir for a hydraulic tensioner for a power transmission chain of claim 1 wherein said first fluid passage has a diameter equal to the diameter of said seal cap so that said seal cap is tightly fit in said first passage.

5. The reservoir for a hydraulic tensioner for a power transmission chain of claim 4 wherein said diameter of said second passage is less than the diameter of said first passage.

6. The reservoir for a hydraulic tensioner for a power transmission chain of claim 3 wherein said second passage is formed in said housing of said tensioner, said housing being mounted on the side of an engine block.

7. The reservoir for a hydraulic tensioner for a power transmission chain of claim 6 wherein said first passage is formed in said engine block.

8. A reservoir for a hydraulic tensioner according to claim 1, wherein the orifice of the seal cap permits reversible flow of fluid therethrough.

9. A hydraulic tensioner for applying a tensioning force to a chain in an automotive engine system upon start up of the system, the tensioner comprising:

a housing having a bore;

a piston slidably received within the bore to define a fluid chamber therebetween;

a spring member biasing the piston outwardly from within the bore;

a fluid passage extending between the fluid chamber and a source of pressurized fluid;

a fluid reservoir in the fluid passage between the fluid chamber and the source of pressurized fluid;

means for retaining an amount of fluid in the reservoir means when the tensioner is not in operation effective to pressurize the fluid chamber upon start-up of the engine system.

\* \* \* \* \*